United States Patent [19]

Wang

[11] Patent Number: 5,734,856
[45] Date of Patent: Mar. 31, 1998

[54] SYSTEM AND METHOD FOR GENERATING SUPPLEMENTAL READY SIGNALS TO ELIMINATE WASTED CYCLES BETWEEN OPERATIONS

[75] Inventor: Johannes Wang, Redwood City, Calif.

[73] Assignee: Seiko Epson Corporation, Tokyo, Japan

[21] Appl. No.: 673,465

[22] Filed: Jul. 1, 1996

Related U.S. Application Data

[63] Continuation of Ser. No. 222,866, Apr. 5, 1994, abandoned.

[51] Int. Cl.⁶ .................................................. G06F 9/38
[52] U.S. Cl. ............................................................ 395/395
[58] Field of Search ................................. 395/376, 395

[56] References Cited

U.S. PATENT DOCUMENTS

| | | | |
|---|---|---|---|
| 4,298,927 | 11/1981 | Berglund et al. | 395/383 |
| 4,464,715 | 8/1984 | Stamm | 395/433 |
| 4,855,901 | 8/1989 | Planteline | 395/285 |
| 4,876,670 | 10/1989 | Nakabayashi et al. | 365/194 |
| 5,150,470 | 9/1992 | Hicks et al. | 395/393 |
| 5,226,063 | 7/1993 | Higashitsutsumi | 377/44 |
| 5,307,478 | 4/1994 | Rasbold et al. | 395/500 |
| 5,386,585 | 1/1995 | Traylor | 395/800 |
| 5,487,156 | 1/1996 | Popescu et al. | 395/393 |

OTHER PUBLICATIONS

Hennessy et al. "Computer Architecture A Quantitative Approach", 1990, pp. 449–450.

*Primary Examiner*—Parshotam S. Lall
*Assistant Examiner*—Kenneth R. Coulter
*Attorney, Agent, or Firm*—Sterne, Kessler, Goldstein & Fox PLLC

[57] ABSTRACT

A data processing system comprising a controller, a functional unit coupled to the controller, to perform a first operation having an operational latency, and a supplemental ready signal generator coupled to the controller. The functional unit requires an initial lead time period before beginning a second operation. After the supplemental ready signal generator receives a first load signal it forwards a supplemental ready signal to the controller. The timing of the supplemental ready signal is a function of the operational latency. The supplemental ready signal indicates to the controller when the functional unit will output results corresponding to the first operation. The controller can then send a second load signal to the functional unit early enough to accommodate the initial lead time period, thereby permitting the functional unit to perform the second operation after the first operation completes without incurring wait cycles between the first and second operations.

34 Claims, 2 Drawing Sheets

SYSTEM AND METHOD FOR GENERATING SUPPLEMENTAL READY SIGNALS TO ELIMINATE WASTED CYCLES BETWEEN OPERATIONS

This application is a continuation of application Ser. No. 08/222,866, filed Apr. 5, 1994, now abandoned.

BACKGROUND OF THE INVENTION

1. Field of the Invention

The invention generally relates to computers, and more particularly, to a computer architecture having a system and method for generating supplemental ready signals to eliminate wasted cycles between operations.

2. Related Art

Computer systems comprise many functional units to perform various operations, such as instruction fetch and execution, data load and store transactions with memory, input/output (I/O) operations, and the like. Single and multi-processor computer systems having reduced or complex instruction sets comprise such functional units. The functional units and their operations are synchronized by a system clock.

Each functional unit typically receives control signals and data, and then begins to perform its operation. With few exceptions, such as interrupts, the functional unit ignores any further inputs until it completes its operation. Some functional units generate a ready signal indicating that a result will soon be output. This is a typical handshaking technique.

Another technique used to pass results from functional unit to functional unit is called buffering. Results are passed from one stage to the next and the output (i.e., result) of each stage is buffered until the next stage is ready to begin its operation. This type of buffering is common on clock boundaries of pipelined processors and is usually done between stages of the pipeline.

Today, designers use basic building blocks to design microprocessors. The basic building blocks can be as large as a functional unit, such as a floating point unit or a register file, or as small as a simple content-addressable memory (CAM). Commercially-available computer aided design (CAD) tools are available for integrating basic building blocks to implement various designs.

Data processor design techniques based on libraries having predefined megacells (see U.S. patent application Ser. No. 07/831,272, filed Feb. 7, 1992, titled Hardware Accelerator With Real Silicon Components) can suffer from unnecessary wait cycles. Datapath layout and basic timing parameters for the megacell are set by control logic built into each megacell. For each new design that couples megacells together, control logic is generated using CAD tools to control the timing of data and control signals between megacells. It is not uncommon that megacells cannot meet the timing requirements of a new design simply because such requirements were not considered when the megacell datapath and control logic was designed.

What is desired is a mechanism that signals operation completion and eliminates unnecessary wait cycles between operations.

SUMMARY OF THE INVENTION

The present invention is directed to a system and method for generating a supplemental ready signal to eliminate wait cycles between operations of a computer system. The system comprising a controller, a functional unit coupled to the controller, to perform a first operation having an operational latency, and a supplemental ready signal generator coupled to the controller.

The functional unit requires an initial lead time period before beginning a second operation. After the supplemental ready signal generator receives a first load signal, which indicates that an operation is to begin, it forwards a supplemental ready signal to the controller. The timing of the supplemental ready signal is a function of the operational latency.

The supplemental ready signal indicates to the controller when the functional unit will output results corresponding to the first (i.e., previous) operation. The controller can then send a second (i.e., next) load signal to the functional unit early enough to accommodate the initial lead time period, thereby permitting the functional unit to perform the second operation after the first operation completes without incurring wait cycles between the first and second operations.

In a preferred embodiment, the supplemental ready signal generator includes means for waiting one or more cycles after receiving a load signal and then sending the supplemental ready signal to the state machine, such that the recipient state machine has enough time (1 or more cycles) to schedule and assert the next load signal. In a further embodiment, the means for waiting comprises a decoder to determine how many cycles to wait based on the first operation. The decoder decodes opcode information to determine how many cycles to wait after receiving a load signal. In a still further embodiment, the means for waiting comprises a counter coupled to the decoder. The counter can be a binary counter, a polynomial counter, or the like.

The foregoing and other features and advantages of the present invention will be apparent from the following, more particular description of the preferred embodiments of the invention, as illustrated in the accompanying figures.

DETAILED DESCRIPTION OF THE PREFERRED EMBODIMENTS

The preferred embodiment of the present invention is discussed in detail below. While specific steps, configurations and arrangements are discussed, it should be understood that this is done for illustration purposes only. A person skilled in the relevant art will recognize that other steps, configurations and arrangements may be used without departing from the spirit and scope of the invention.

The preferred embodiment of the invention is now described with reference to the figures where like reference numbers indicate identical or functionally similar features. Also in the figures, the left-most digit of each reference number corresponds to the figure in which the reference number is first used.

The following three text books provide further discussions of RISC architecture: John L. Hennessy and David A. Patterson, *Computer Architecture—A Quantitative Approach*, (Morgan Kaufmann Publishers, Inc., San Mateo, Calif., U.S.A., 1990); Mike Johnson, *Superscalar Microprocessor Design*, (Prentice Hall, Englewood Cliffs, N.J., U.S.A., 1991); and Stephen B. Furber, *VLSI RISC Architecture and Organization*, (Marcel Dekker, Inc., New York, N.Y., U.S.A., 1989).

Figure 1:
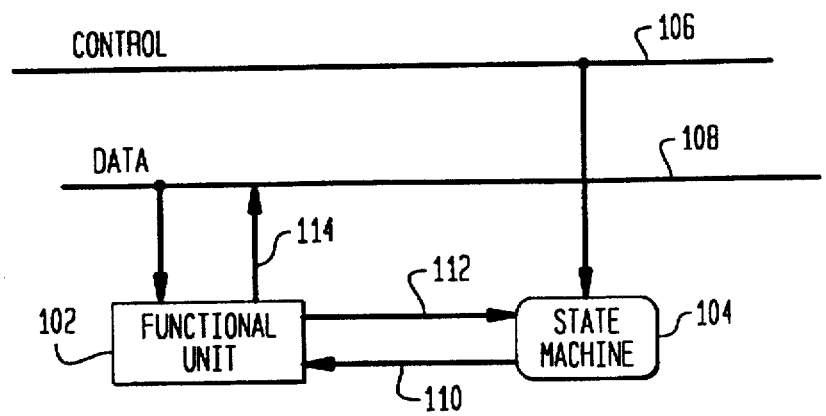
FIG. 1 shows a representative block diagram of a functional unit and its state machine.

FIG. 1 shows a functional unit 102 and a state machine 104. State machine 104 controls the functional unit 102, and is capable of controlling additional functional units (not shown). Functional unit 102 and state machine 104 are coupled to a control bus 106 and a data bus 108. Buses 106 and 108 provide control signals, instructions and data required by state machine 104 and functional unit 102, respectively. Functional unit 102 generates a "standard ready signal" indicating to state machine 104 that functional unit 102 is soon going to output results, and thus is ready to perform a next operation.

The standard ready signal is always generated a predetermined number of cycles before functional unit 102 outputs a result. The standard ready signal causes wait cycles between operations if it is output too late. An example of "too late" would be if state machine 104 must evaluate other signals it receives over control bus 106 before it can decide whether functional unit 102 can start the next operation. State machine 104 therefore requires an "initial lead time period" before starting the next operation. If the ready signal is sent too early, the initial lead time period may not elapse before functional unit 102 completes its operation. This causes wait cycles to occur between operations.

State machine 104 provides a load signal via a bus 110 to the functional unit 102 instructing functional unit 102 to begin its operation. State machine 104 generates the load signal based on information received over control bus 106, as will become evident to those skilled in the art. After it receives the load signal, functional unit 102 performs its operation and outputs a result on an output bus 114 and transfers the result to data bus 108.

Figure 3:
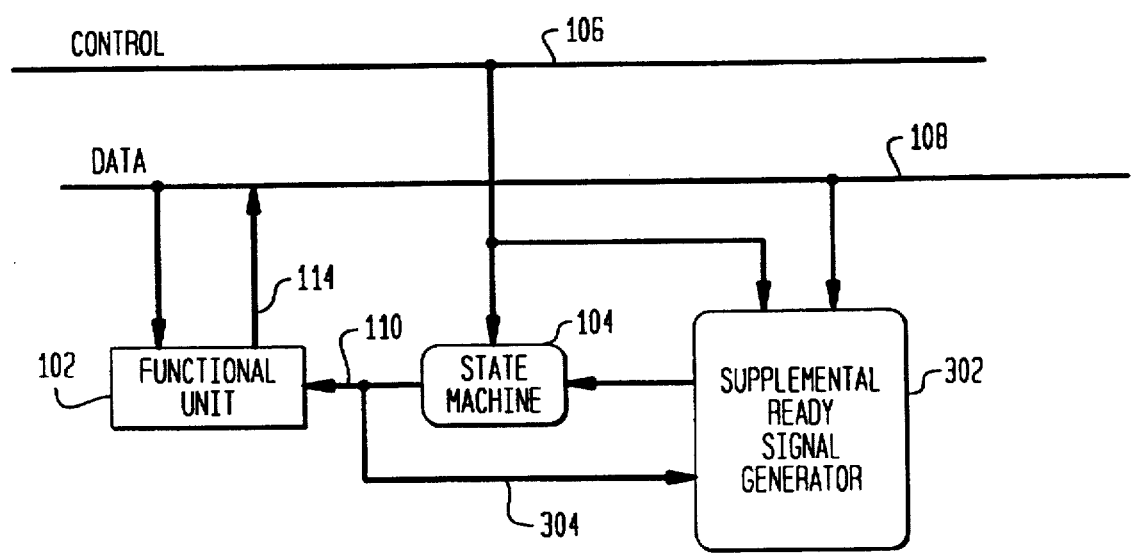
FIG. 3 shows a representative block diagram of a supplemental ready signal generator in accordance with the present invention.
Figure 2:
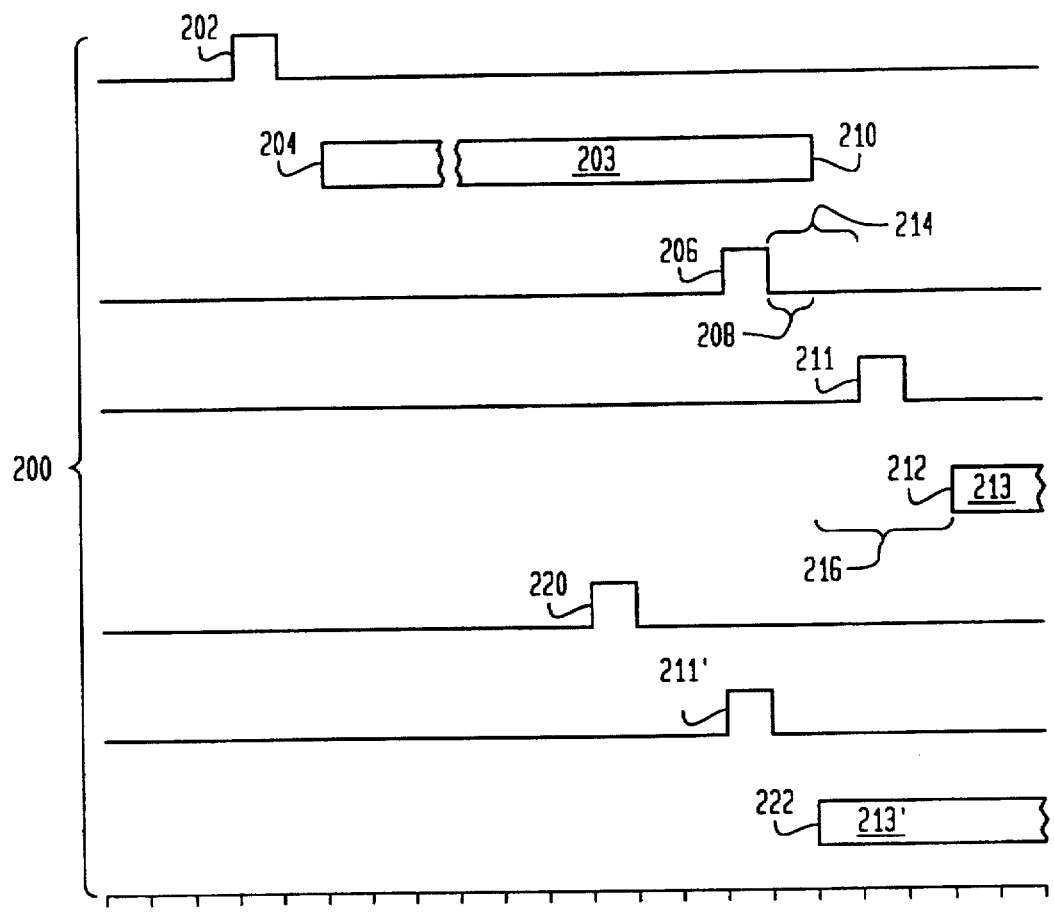
FIG. 2 shows a timing diagram for various signals in connection with FIGS. 1 and 3.

FIG. 2 shows the timing of a number of signals 200 corresponding to FIGS. 1 and 3 (FIG. 3 will be described in detail below). Clock cycles are indicated as hash marks along the bottom of FIG. 2. A representative operational example for FIG. 1 will now be described in connection with signals shown in FIG. 2.

At a time 202 state machine 104 generates a load signal and forwards it to functional unit 102 via bus 110. Functional unit 102 then begins to perform a first operation 203 at a time 204. Functional unit 102 generates a standard ready signal at a time 206, which is a first time period 208 before first operation 203 is completed, and forwards it to state machine 104. Functional unit 102 outputs results at a time 210, which is when operation 203 is completed.

After receiving the ready signal at time 206, state machine 104 sends another (second or next) load signal to functional unit 102 at a time 211. The second load signal is not sent until an initial lead time 214 is expired. Initial lead time 214 is greater than first time period 208. Standard ready signal 206 is thus too late to permit functional unit 102 to begin when its inputs are stable, which is an extremely short period of time just after time 210. A second operation 213 (which can start at a time 212) is therefore delayed a time period 216.

In connection with the present invention, the inventor discovered that the second operation could begin sooner if state machine 104 receives a "supplemental ready signal" early enough at a time 220 to permit a next operation 213' to begin at a time 222, which is as soon as the result from first operation 203 is available (see time 210) and after a second load signal 211'. This eliminates the wasted cycles between the two operations. In other words, the supplemental ready signal is early enough so that the initial time period required by state machine 104 ends just as the first result from functional unit 102 becomes available at time 210. This allows the two operations to be performed in a near-seamless manner.

The present invention is applicable when a functional unit must be fit into a stage where it might not have been designed for because of timing constraints. The number of cycles for a particular functional unit to perform its operation are either (1) known in advance, or (2) must be determined by decoding an instruction's opcode.

According to the present invention, the total number of cycles for the operation to complete can be provided to the supplemental ready signal generator. The supplemental ready signal generator can count once the operation begins. A few cycles before the operation is completed, the supplemental ready signal generator can generate a supplemental ready signal to indicate that a result will soon be ready. Use of the supplemental ready signal eliminates conventional buffering and/or handshaking, thus saving valuable time and/or minimizing logic. An advantage of the present invention is that the supplemental ready signal generator takes up less chip area than conventional buffers required for conventional buffering of results.

FIG. 3 shows a representative block diagram of a (first) functional unit 102, state machine 104 and a supplemental ready signal generator 302 according to the present invention. Supplemental ready signal generator 302 can also be coupled to control bus 106 and data bus 108. Supplemental ready signal generator 302 can receive a load signal from the state machine 104 via a bus 304. According to the present invention, supplemental ready signal generator 302 generates a supplemental ready signal and transfers the supplemental ready signal via bus 306 to state machine 104.

As would be apparent to a person skilled in the relevant art, supplemental ready signal generator 302 may be implemented in a variety of ways. In a first embodiment in which the latency of the operation performed by functional unit 102 is known, supplemental ready signal generator 302 may be pre-programmed to output the supplemental ready signal a number of cycles before the result is output by functional unit 102 to accommodate the initial time period (discussed above). Thus, the standard ready signal (211) provided by functional unit 102 is simply ignored.

In another embodiment of the present invention in which functional unit 102 can perform more than one type of operation, state machine 104 can decode the opcode, for example, of an instruction being executed by functional unit 102. By decoding the instruction, state machine 104 can determine how long it takes functional unit 102 to perform its operation. This information is sent to the supplemental ready signal generator 302 by state machine 104. Supplemental ready signal generator 302 can then count the necessary number of cycles before forwarding the supplemental ready signal to the next functional unit.

For example, if the next functional unit requires the supplemental ready signal five cycles in advance of receiving the result, supplemental ready signal generator 302 can be programmed with this information. After decoding the operation to be performed by functional unit 102, supplemental ready signal generator 302 will simply subtract five cycles from the total operation latency of that operation. Supplemental ready signal generator 302 can then begin either counting (up or down) until it reaches a point five cycles before it knows that the operation will be completed by functional unit 102. At that instant, supplemental ready signal generator 302 will output the supplemental ready signal 306 to state machine 104.

According to this embodiment, simple binary counting may be performed. Alternatively, polynomial counting can be used.

Supplemental ready signal generator 302 can be implemented as a control block separate from state machine 104, or the functionality of supplemental ready signal generator 302 can be added to state machine 104. An example of the latter can be envisioned using the megacell library design approach referred to above in the Background section. Megacells in the library have predefined functions controlled by logic included in the megacell itself. When two or more megacells are chosen from the library for integration to facilitate a new design, control logic in the form of a state machine must be designed to control the timing and/or sequence of operations performed by the selected megacells. This state machine can be designed to include the functionality of a supplemental ready signal generator in the event that the standard ready signal of one or more of the megacells does not meet the timing requirements of the new design.

While various embodiments of the present invention have been described above, it should be understood that they have been presented by way of example, and not limitation. It will be apparent to persons skilled in the relevant art that various changes in form and detail may be made therein without departing from the spirit and scope of the invention. Thus, the present invention should not be limited by any of the above-described exemplary embodiments, but should be defined only in accordance with the following claims and their equivalents. All cited patent documents and publications in the above description are incorporated herein by reference.

What is claimed is:

1. A data processing system comprising:
   a controller to generate first and second load signals;
   a functional unit coupled to said controller,
      wherein upon receipt of said first and second load signals said functional unit begins first and second operations, respectively, said first operation having an operational latency; and
   a supplemental ready signal generator coupled to said controller, to receive said first load signal and forward a supplemental ready signal to said controller,
      wherein timing of said supplemental ready signal is a function of said operational latency of said first operation and an initial lead time period required to begin said second operation, and
      wherein said supplemental ready signal is received by said controller so that said controller can send said second load signal to said functional unit thereby enabling said functional unit to perform said second operation after said first operation completes without incurring wait cycles between said first and second operations.

2. The data processing system according to claim 1, wherein said supplemental ready signal generator comprises means for waiting one or more cycles after receiving said first load signal and then sending said second load signal to said functional unit.

3. The data processing system according to claim 2, wherein said means for waiting determines how long to wait based on said first operation.

4. The data processing system according to claim 2, wherein said means for waiting comprises a decoder to determine how many cycles to wait based on said first operation.

5. The data processing system according to claim 2, wherein said means for waiting comprises a decoder to decode opcode information to determine how many cycles to wait after receiving said first load signal.

6. The data processing system according to claim 3, wherein said means for waiting comprises a counter.

7. The data processing system according to claim 4, wherein said means for waiting includes a counter coupled to said decoder.

8. The data processing system according to claim 6, wherein said counter is a binary counter.

9. The data processing system according to claim 6, wherein said counter is a polynomial counter.

10. The data processing system according to claim 1, wherein said functional unit is located within a pipeline.

11. The data processing system according to claim 1, wherein said controller comprises a state machine.

12. In a data processing system comprising a functional unit, a controller coupled to said functional unit and a supplemental ready signal generator coupled to said controller, a method comprising the steps of:
   forwarding a first load signal to said functional unit and said supplemental ready signal generator;
   performing a first operation having an operational latency;
   forwarding a supplemental ready signal to said controller, wherein timing of said supplemental ready signal is a function of said operational latency and an initial lead time period required to begin a second operation;
   sending a second load signal to said functional unit; and
   performing said second operation after said first operation completes without incurring wait cycles between said first and second operations.

13. The method according to claim 12, further comprising the steps of:
   waiting one or more cycles after said first load signal; and
   sending said second load signal to said functional unit.

14. The method according to claim 12, further comprising the step of:
   determining how long to wait based on said first operation.

15. The method according to claim 12, further comprising the step of:
   decoding the first operation to determine how many cycles to wait before forwarding said supplemental ready signal and counting said determined number of cycles.

16. The method according to claim 15, wherein said counting is binary counting.

17. The method according to claim 15, wherein said counting is polynomial counting.

18. A data processing system comprising:
   a controller to generate first and second load signals;
   first and second functional units coupled to said controller,
      wherein upon receipt of said first and second load signals said first and second functional units begin first and second operations, respectively, said first operation having an operational latency; and
   a supplemental ready signal generator coupled to said controller, to receive said first load signal and forward a supplemental ready signal to said controller.

wherein timing of said supplemental ready signal is a function of said operational latency of said first operation and an initial lead time period required to begin said second operation, and wherein said supplemental ready signal is received by said controller so that said controller can send said second load signal to said second functional unit; thereby enabling said second functional unit to perform said second operation after said first operation completes without incurring wait cycles between said first and second operations.

19. The data processing system according to claim 18, wherein said supplemental ready signal generator comprises means for waiting one or more cycles after receiving said first load signal and then-sending said second load signal to said second functional unit.

20. The data processing system according to claim 19, wherein said means for waiting determines how long to wait based on said first operation.

21. The data processing system according to claim 19, wherein said means for waiting comprises a decoder to determine how many cycles to wait based on said first operation.

22. The data processing system according to claim 19, wherein said means for waiting comprises a decoder to decode opcode information to determine how many cycles to wait after receiving said first load signal.

23. The data processing system according to claim 20, wherein said means for waiting comprises a counter.

24. The data processing system according to claim 21, wherein said means for waiting includes a counter coupled to said decoder.

25. The data processing system according to claim 23, wherein said counter is a binary counter.

26. The data processing system according to claim 23, wherein said counter is a polynomial counter.

27. The data processing system according to claim 18, wherein said functional unit is located within a pipeline.

28. The data processing system according to claim 18, wherein said controller comprises a state machine.

29. In a data processing system comprising first and second functional units, a controller coupled to each functional unit, and a supplemental ready signal generator coupled to said controller, a method comprising the steps of:

forwarding a first load signal to said first functional unit and said supplemental ready signal generator;

performing a first operation having an operational latency;

forwarding a supplemental ready signal to said controller, wherein timing of said supplemental ready signal is a function of said operational latency and an initial lead time period required to begin a second operation;

sending a second load signal to said second functional unit; and performing said second operation after said first operation completes without incurring wait cycles between said first and second operations.

30. The method according to claim 29, further comprising the steps of:

waiting one or more cycles after said first load signal; and sending said second load signal to said second functional unit.

31. The method according to claim 29, further comprising the step of determining how long to wait based on said first operation.

32. The method according to claim 29, further comprising the step of decoding the first operation to determine how many cycles to wait before forwarding said supplemental ready signal and counting said determined number of cycles.

33. The method according to claim 32, wherein said counting is binary counting.

34. The method according to claim 32, wherein said counting is polynomial counting.

* * * * *